US012750179B2

(12) United States Patent
Wagner

(10) Patent No.: US 12,750,179 B2
(45) Date of Patent: Sep. 29, 2026

(54) REFERENCE SIGNALS IN CELLULAR COMMUNICATION NETWORKS

(71) Applicant: Huizhou TCL Cloud Internet Corporation Technology Co., Ltd., Huizhou (CN)

(72) Inventor: Sebastian Wagner, Huizhou (CN)

(73) Assignee: Huizhou TCL Cloud Internet Corporation Technology Co., Ltd., Huizhou (CN)

(*) Notice: Subject to any disclaimer, the term of this patent is extended or adjusted under 35 U.S.C. 154(b) by 349 days.

(21) Appl. No.: 18/027,129

(22) PCT Filed: Sep. 27, 2021

(86) PCT No.: PCT/CN2021/121104
§ 371 (c)(1),
(2) Date: Mar. 20, 2023

(87) PCT Pub. No.: WO2022/078203
PCT Pub. Date: Apr. 21, 2022

(65) Prior Publication Data

US 2023/0336298 A1 Oct. 19, 2023

Related U.S. Application Data

(60) Provisional application No. 63/091,252, filed on Oct. 13, 2020.

(51) Int. Cl.

| | |
|---|---|
| ***H04W 68/02*** | (2009.01) |
| ***H04L 5/00*** | (2006.01) |
| ***H04W 68/00*** | (2009.01) |

(52) U.S. Cl.
CPC .......... *H04L 5/0048* (2013.01); *H04W 68/02* (2013.01)

(58) Field of Classification Search
CPC ............................ H04L 5/0048; H04W 68/02
(Continued)

(56) References Cited

U.S. PATENT DOCUMENTS

2015/0092691 A1* 4/2015 Hwang ................ H04L 5/0048 370/329
2018/0205526 A1* 7/2018 Kim ..................... H04L 1/0026
(Continued)

FOREIGN PATENT DOCUMENTS

CN 110226351 A 9/2019
CN 110268673 A 9/2019
(Continued)

OTHER PUBLICATIONS

European Search Report in European application No. 21879249.7, mailed on Oct. 22, 2024.
(Continued)

*Primary Examiner* — Mark G. Pannell
(74) *Attorney, Agent, or Firm* — PV IP PC; Wei Te Chung

(57) ABSTRACT

For transmission of tracking reference signals in a cellular network a periodic set of transmission occasions is defined. A window is also defined in relation to at least one paging occasion, wherein the base station does not transmit tracking reference signals outside of the window. The base station also transmits an indication of active transmission occasions within the window and only transmits tracking reference signals in active transmission occasions.

17 Claims, 3 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2019/0215117 | A1 | 7/2019 | Lee | |
| 2020/0145918 | A1* | 5/2020 | Ji | H04W 52/0229 |
| 2020/0146107 | A1* | 5/2020 | Xiong | H04W 76/27 |
| 2020/0305232 | A1* | 9/2020 | Miao | H04W 68/02 |
| 2021/0135821 | A1* | 5/2021 | Guan | H04L 5/0048 |
| 2021/0153162 | A1* | 5/2021 | Chen | H04W 56/001 |
| 2021/0288773 | A1* | 9/2021 | Lin | H04W 56/001 |
| 2022/0060298 | A1* | 2/2022 | Taherzadeh Boroujeni | H04L 27/2613 |
| 2022/0158793 | A1* | 5/2022 | Selvaganapathy | H04L 27/2602 |
| 2023/0019909 | A1* | 1/2023 | Zhang | H04L 5/0051 |
| 2023/0180165 | A1* | 6/2023 | Su | H04L 27/2663 370/503 |
| 2023/0198725 | A1* | 6/2023 | Abdelghaffar | H04B 7/0626 370/252 |

FOREIGN PATENT DOCUMENTS

| | | | |
|---|---|---|---|
| CN | 110447286 | A | 11/2019 |
| CN | 111385826 | A | 7/2020 |
| EP | 3583732 | A1 | 12/2019 |
| WO | 2019029711 | A1 | 2/2019 |
| WO | 2020057634 | A1 | 3/2020 |

OTHER PUBLICATIONS

International Search Report in International application No. PCT/CN2021/121104, mailed on Dec. 30, 2021.

Written Opinion of the International Search Authority in International application No. PCT/CN2021/121104,mailed on Dec. 30, 2021.

Huawei et al. “Assistance RS occasions for IDLE/inactive mode” 3GPP TSG RAN WG1 Meeting #102-e, R1-2005263, Aug. 28, 2020 (Aug. 28, 2020), sections 2-4.

Chinese Office Action issued in corresponding Chinese Patent Application No. 202180070171.X dated Jun. 29, 2025, pp. 1-14.

Chinese Office Action issued in corresponding Chinese Patent Application No. 202180070171.X dated Jan. 31, 2026, pp. 1-10.

* cited by examiner

REFERENCE SIGNALS IN CELLULAR COMMUNICATION NETWORKS

CROSS REFERENCE TO RELATED APPLICATIONS

The disclosure is a US national phase application based upon an International Application No. PCT/CN2021/121104, filed on Sep. 27, 2021, titled "REFERENCE SIGNALS IN CELLULAR COMMUNICATION NETWORKS", which claims priority to U.S. provisional patent application No. 63/091,252 filed on Oct. 13, 2020, which is incorporated by reference in the present application in its entirety.

BACKGROUND OF DISCLOSURE

1. Field of Disclosure

The following disclosure relates to reference signals in cellular communication networks, and in particular to tracking reference signals for UEs in the RRC IDLE/INACTIVE states.

2. Description of Related Art

Wireless communication systems, such as the third-generation (3G) of mobile telephone standards and technology are well known. Such 3G standards and technology have been developed by the Third Generation Partnership Project (3GPP)®. The 3rd generation of wireless communications has generally been developed to support macro-cell mobile phone communications. Communication systems and networks have developed towards a broadband and mobile system.

In cellular wireless communication systems User Equipment (UE) is connected by a wireless link to a Radio Access Network (RAN). The RAN comprises a set of base stations which provide wireless links to the UEs located in cells covered by the base station, and an interface to a Core Network (CN) which provides overall network control. As will be appreciated the RAN and CN each conduct respective functions in relation to the overall network. For convenience the term cellular network will be used to refer to the combined RAN &CN, and it will be understood that the term is used to refer to the respective system for performing the disclosed function.

The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB. NR is proposed to utilise an Orthogonal Frequency Division Multiplexed (OFDM) Physical Transmission Format.

The NR protocols are intended to offer options for operating in unlicensed radio bands, to be known as NR-U. When operating in an unlicensed radio band the gNB and UE must compete with other devices for physical medium/resource access. For example, Wi-Fi®, NR-U, and LAA may utilise the same physical resources.

The disclosure below relates to various improvements to cellular wireless communications systems.

SUMMARY

The invention is defined in the appended claims, in which there is required a method of configuring tracking reference signals in a cellular communications system for use while a UE is in idle mode, the method performed by a base station and comprising the steps of defining at least one tracking reference signal configuration comprising periodic transmission occasions for tracking reference signals; defining a tracking reference signal window in relation to at least one paging occasion, wherein the base station only transmits tracking reference signals in transmission occasions which are within the window; transmitting an indication of active transmission occasions within the tracking reference signal window in which the base station will transmit tracking reference signals; and transmitting tracking reference signals in the active transmission occasions.

The indication of active transmission occasions may comprise a bitmap.

Bits of the bitmap may correspond to transmission occasions and indicate whether the transmission occasion is active.

The periodic transmission occasions may have a period of 10, 20, 40, or 80 ms.

The window may span at least the period between a paging indication corresponding to the paging occasion and the paging occasion.

The tracking reference signal configuration may be specific for use while UEs are in idle mode.

The tracking reference signal configuration may be transmitted in RRC signalling.

The tracking reference signal configuration may be transmitted in a system information block transmission.

The tracking reference signal configuration may be cell specific or paging occasion specific.

The active transmission occasions may include at least one occasion prior to a paging indication.

The active transmission occasions may apply to a group of UEs which are active for a particular paging occasion.

The indication of active transmission occasions may comprise a sequence transmitted as a paging indication.

Each sequence may correspond to a set of active transmission occasions.

The indication of active transmission occasions may comprise the timing of a paging indication relative to the related paging occasion.

The indication of active transmission occasions is transmitted in RRC signalling.

There is also required a base station configure to perform the steps of the method.

The method may further comprise transmitting an indication of a tracking reference signal configuration of the defined at least one tracking reference signal configurations which is enabled for a UE to which the indication is transmitted.

The indication may be transmitted as a bitmap in which each bit corresponds to a tracking reference signal configuration.

BRIEF DESCRIPTION OF DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION OF EMBODIMENTS

Those skilled in the art will recognise and appreciate that the specifics of the examples described are merely illustrative of some embodiments and that the teachings set forth herein are applicable in a variety of alternative settings.

Figure 1:
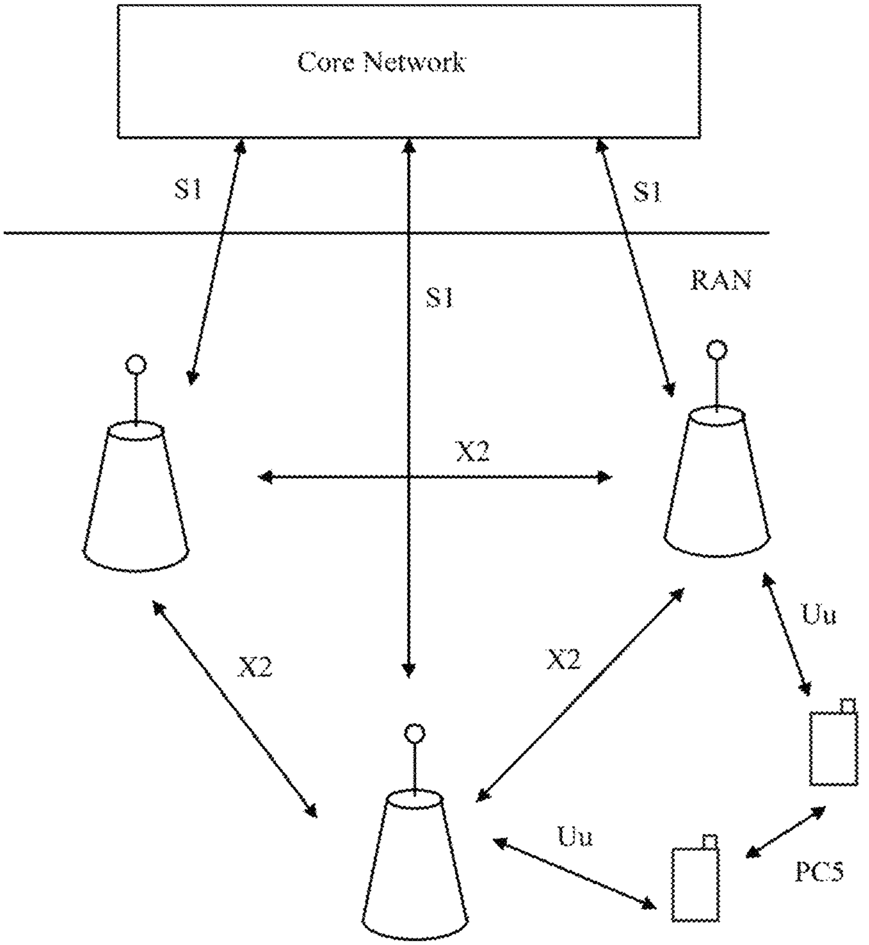
FIGS. 1 and 2 show schematic diagrams of elements of a cellular communications system.
Figure 2:
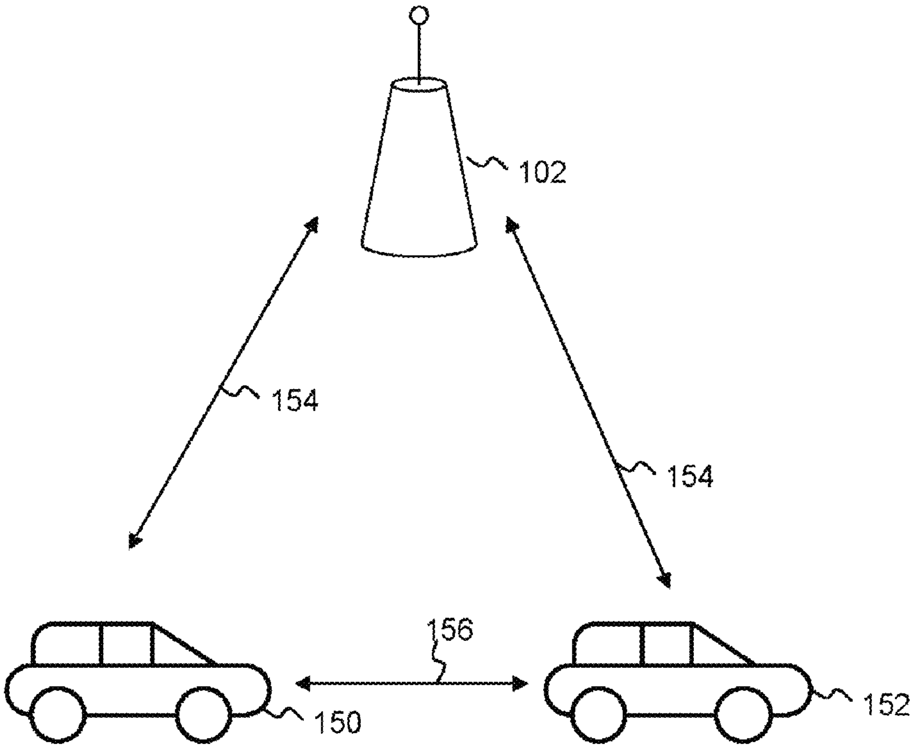

FIG. 1 shows a schematic diagram of three base stations (for example, eNB or gNBs depending on the particular cellular standard and terminology) forming a cellular network. Typically, each of the base stations will be deployed by one cellular network operator to provide geographic coverage for UEs in the area. The base stations form a Radio Area Network (RAN). Each base station provides wireless coverage for UEs in its area or cell. The base stations are interconnected via the X2 interface and are connected to the core network via the S1 interface. As will be appreciated only basic details are shown for the purposes of exemplifying the key features of a cellular network. A PC5 interface is provided between UEs for SideLink (SL) communications. The interface and component names mentioned in relation to FIG. 1 are used for example only and different systems, operating to the same principles, may use different nomenclature.

The base stations each comprise hardware and software to implement the RAN's functionality, including communications with the core network and other base stations, carriage of control and data signals between the core network and UEs, and maintaining wireless communications with UEs associated with each base station. The core network comprises hardware and software to implement the network functionality, such as overall network management and control, and routing of calls and data.

Power conservation is important for UEs, particularly low-power devices such as industrial sensors and wearables which may be expected to operate for several years on a single charge. Machine-Type Communication (MTC) UEs have been defined to support implementation of such low-power devices, and NB-IoT has been specified for static and nomadic IoT type devices (e.g. pressure sensors).

To reduce power consumption UEs can spend significant time in RRC_IDLE mode utilising Discontinuous Reception (DRX) to turn off receive elements and wake up to receive periodic paging messages. Decoding paging messages is relatively expensive in terms of power consumption and generally includes the following steps:—

1. UE wakes up before the paging occasion (PO).
2. UE turns on RF and baseband.
3. AGC and time-frequency synchronization (referred to as loop convergence) as well as serving cell confirmation.
4. UE attempts PDCCH decoding for paging DCI (P-DCI) scrambled with P-RNTI.
5. If no paging DCI is found, the UE goes back to sleep.
6. If paging DCI is found, depending on payload, the UE decodes subsequent PDSCH
7. If UE-identity is included in PDSCH, UE starts RACH procedure, otherwise UE goes back to sleep.

In order to decode the PDCCH, AGC convergence and time-frequency synchronization are required. However, unlike in LTE, in NR always-on RS are not available for precise time-frequency tracking in RRC IDLE/INACTIVE and SSBs have to be used instead. Typically, SSBs only allow for a coarse time-frequency offset estimation and thus Tracking Reference Signals (TRS) have been introduced in RRC CONNECTED mode to allow for high precision time-frequency tracking and synchronisation (known as loop convergence).

The loop convergence process based on SSBs consumes a significant amount of power before attempting to decode PDCCH. It is estimated that a UE operating in NR may require twice as much time (and hence increased power consumption) for loop convergence than was required in LTE.

The following disclosure intends to provide methods and arrangements to reduce power consumption when UEs wake up to receive paging messages. UEs applying DRX, and waking up for paging occasions, will be in RRC_IDLE or RRC_INACTIVE mode, for which TRS are not currently available. The following disclosure sets out processes to make TRS available in those RRC modes such that they can be utilised by a UE waking up for a paging occasion. TRS transmission consumes radio resources and hence it is undesirable to transmit them at all times if they may not be required. Also, it is preferable to align TRS occasions for RRC_IDLE/INACTIVE UEs with TRS occasions for RRC_CONNECTED devices such that they share transmission resources.

TRS are a UE-specific configuration of a CSI-RS and are configured via NZP-CSI-RS-ResourceSet with the parameter trs-Info set to true The configuration is referred to below as TRS-ResourceSet. Each UE may be configured with multiple TRS-ResourceSets, of which at least one is configured with periodic resources. Other TRS-ResourceSets may be configured with aperiodic CSI-RS resources. Periodic resources will always have a period of 10, 20, 40, or 80 ms (10 ms only being allowed if the BW is 52 RBs or fewer).

The following restrictions apply to the configuration of TRS in order to maximise time-frequency tracking performance:—

Time locations of two resources at symbols (4, 8), (5, 9), and (6, 10) in a slot, for FR1.

Two resources per slot in two consecutive slots for FR1.

Single port with frequency density of $\rho=3$, i.e. 3 REs per RB are TRS.

The bandwidth is either 52 RBs or the whole BW of the BWP.

As discussed in more detail below TRS are arranged in the period between the Paging Indication (PI)/P-DCI and Paging Occasion (PO) to improve loop convergence of UEs waking up for that PO. The location of TRS transmissions may be indicated in the relevant PUP-DCI. Various methods for indication the location of the TRS transmissions are discussed in detail below, together with a method to use TRS with cross-slot scheduling.

The configuration of TRS for use in RRC_IDLE/INACTIVE may be communicated using higher layer (RRC) signalling, for example as part of the SIB transmission. One or more periodic CSI-ResourceConfigs containing NZP-CSI-RS-ResourceSet(s) for TRS which can be shared between RRC_CONNECTED and RRC_IDLE/INACTIVE states are known to UEs in a cell, or all UEs in a cell belonging to the same PO. Hence, the TRS configuration can be either cell-specific or specific to a PO.

Figure 3:
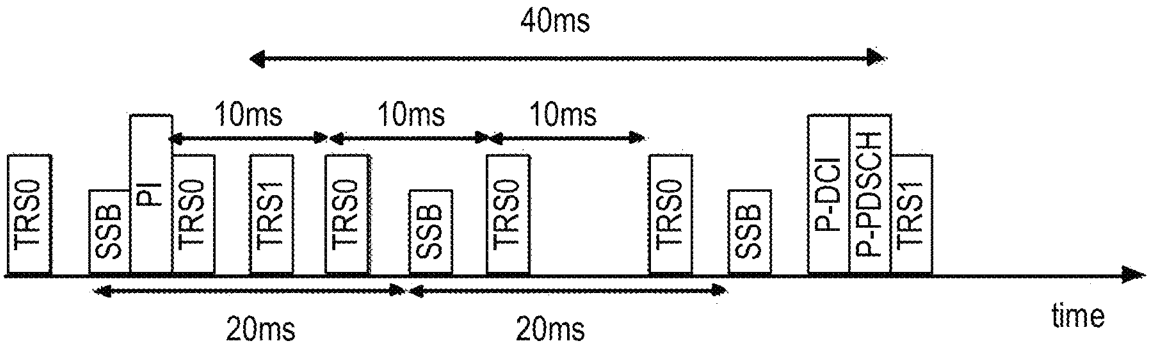
FIGS. 3 to 5 show examples of TRS transmission patterns.

FIG. 3 shows an example in which two TRS-ResourceSets (TRS0 and TRS1) are shared from RRC_CONNECTED to RRC_IDLE/INACTIVE. TRS0 has a period of 10 ms, and TRS1 has a period of 40 ms. These two TRS-ResourceSets provide one TRS occasion shortly before the PI, and a total of 5 TRS occasions between the PI and P-DCI to utilise for loop convergence prior to reception of the P-DCI. The UEs can use any of the TRS occasions from the configured TRS-ResourceSets while in RRC_IDLE/INACTIVE, but the base station may not transmit in every occasion and may need to signal to the UEs which TRS occasions will be used (active occasions) and which are not used (inactive occasions) as discussed below.

Figure 4:
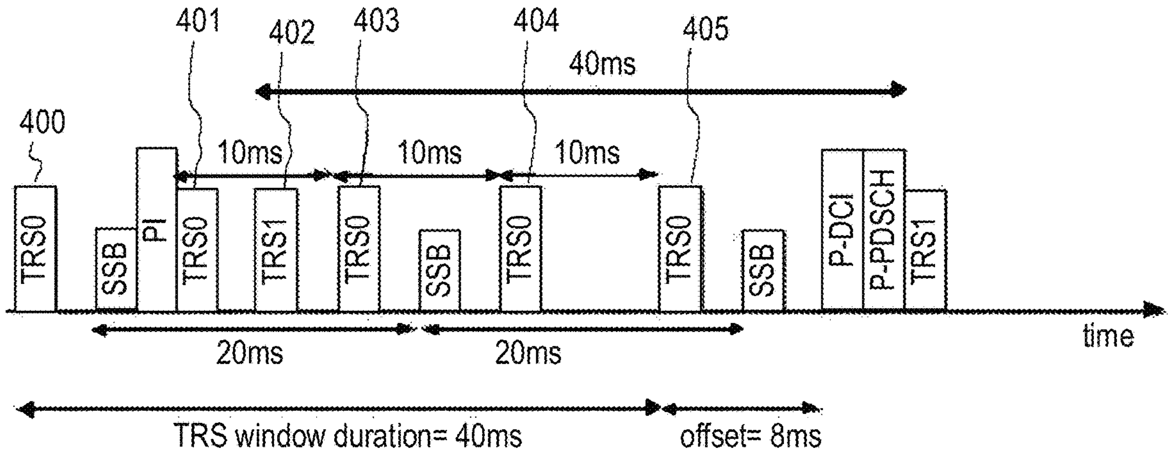

As noted above it is undesirable to transmit TRS continuously as this consumes transmission resources and the UEs may not require the TRS. A window is therefore defined during which the base station might transmit TRS. The window is associated with a PO for which the UEs may wake up, and hence align with the period during which TRS may be useful for that PO. In particular, TRS occasions prior to the PI when a DCI-based PI is utilised, and between the PI and PO in preparation for decoding the P-DCI and paging message or performing RRM measurements. The TRS window may be defined as a time duration and offset from the first PO in the relevant paging frame. FIG. 4 shows an example in which a TRS window is defined with a duration of 40 ms with an offset of 8 ms prior to the PO (start of P-DCI). This window includes occasions 400, 401, 403, and 404 of TRS0, and occasion 402 of TRS1. Notably, due to the specified offset prior to the PO, TRS0 occasion 405 is not available. Only TRS occasions falling inside the TRS window are utilised by the base station, hence removing transmissions at times that are not considered useful for assisting the UEs.

A default TRS window may be configured for each UE for use if a specific TRS window has not been defined. In an example the default TRS window may be the period between the PI and PO.

Paging transmissions are repeated on each beam when beam forming is in operation to ensure reception by UEs, and accordingly the principles described herein are also applied to each beam, including the TRS window and TRS transmissions on each beam.

There is provided a system in which a TRS window is defined in relation to one or more POs, the base station transmits TRS in one or more TRS occasions within the TRS window, and the base station does not transmit TRS in TRS occasions falling outside of that window. The TRS occasions may be defined by TRS-ResourceSets defined RRC_CONNECTED mode and shared with RRC_IDLE/INACTIVE mode.

A base station may elect to only transmit TRS in some of the TRS occasions falling within the TRS window (TRS occasions with a transmission are termed active occasions, and those without a transmission are termed inactive occasions). It is preferable to indicate to the relevant UEs which TRS occasions are active to avoid the UE spending power trying to receive a transmission which is not made. This indication may be provided in the PI/P-DCI or the P-PDSCH. The transmitted configuration persists for subsequent POs, until a different configuration is transmitted, or may be time-limited. A default configuration may be set which may then be modified by transmissions in PI/P-DCI or P-PDSCH. The configuration may also be updated by RRC signalling, but this may be less appropriate for frequent dynamic updates of the configuration, although it may reduce dynamic signalling overhead.

The configuration of active TRS occasions may be group-specific for only UEs which wake-up for the relevant PO. The active TRS occasions may therefore vary for different groups of UEs which may require the base station to transmit TRS in the set of all active TRS occasions in the groups being paged if more than one group is paged.

As well as only transmitting TRS in the TRS window, TRS will also only be transmitted if a relevant UE is being paged in the PO. This may lead to long gaps between TRS transmissions if no UEs in a group are paged. Each UE may need to perform RRM measurements if there is a long gap between the UE being paged, which measurements can be assisted by the reception of TRS. The TRS window may thus be activated, and associated TRS transmissions made, at intervals even if the UE is not being paged. For example, a TRS window may be provided at a period of a defined number of DRX/paging cycles if no relevant UEs are paged within a defined period. The relevant UEs are aware of the cycle of TRS windows provided in this way and so can seek to receive TRS transmissions in active TRS occasions during the TRS window if required for RRM measurements or other purposes. The periodic TRS windows may be configured by RRC signalling.

In general, there are two types of PI utilised in NR systems, either RS-based or DCI-based.

RS PIs utilise a pre-defined sequence which indicates if a P-DCI will be transmitted for the relevant UE. UEs can receive the sequence without requiring fine time-frequency synchronisation, and hence UEs do not require a TRS prior to the PI to be able to receive the RS PI. However, an RS-based PI only gives a binary indication of its presence or absence, it is not possible to encode data within the RS. The presence of an RS may therefore be configured to indicate that all TRS occasions after the PI and before the PO (or all TRS occasions in the TRS window) are active, or that a configured pattern of TRS occasions are active. For the latter example the configured pattern is known by the UE, for example the base station may communicate the pattern of active TRS occasions by RRC or other signalling.

In order to communicate some information on active TRS occasions, more than one sequence may be defined, with each sequence correspond to a TRS configuration. Typically there are already defined a common sequence and a group-specific sequence such that a defined group of UEs can be paged by transmitting the group-specific sequence. A further pair of common and group-specific sequences may be defined. One of the common sequences may then indicate a first configuration of active TRS occasions, and the other common sequence may indicate a second configuration of active TRS occasions, with the same applying to the two group-specific sequences. A limited number of configurations may therefore be indicated, but at the cost of increased blind decoding requirements. Although more than two sets of sequences could be defined, the blind decoding cost increases further. The sequences may be distinguished using cyclic shifts, orthogonal cover codes, or different initialisations of the scrambling sequence.

There is therefore provided a method of paging a UE in which a base station transmits an RS-based PI, wherein the sequence of the RS-based PI is selected to indicate a configuration of TRS transmissions, the base station then transmits TRS in accordance with the indicated configuration. A UE receiving the RS-based PI determines the indicated TRS configuration and listens for TRS at the TRS occasions indicated as being active by that configuration.

Figure 5:
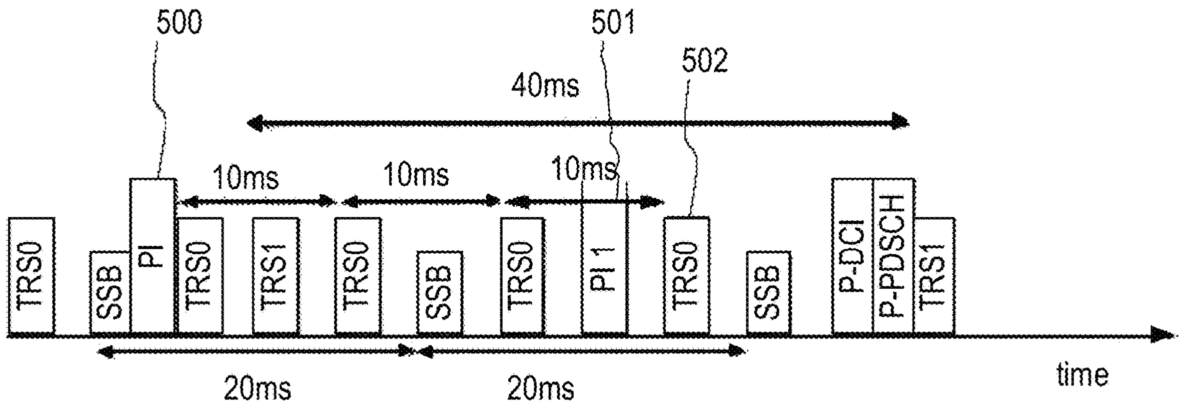

The presence of active TRS occasions may also be indicated by the position of the PI transmission. If the PI is transmitted in a first location, for example closer to the PO, TRS will be transmitted, and if the PI is transmitted in a second location, for example further in advance of the PO, no TRS will be transmitted (and the UE will have to use SSB to achieve loop convergence). UEs will wake up at the first possible transmission location, and if a PI is received will proceed to seek loop convergence based on SSB reception. If a PI is not received at that location the UE can return to sleep and wake up for the second possible location. If a PI is detected at that second location the UE can proceed to receive TRS at the active TRS occasions to achieve loop convergence. If no PI is received the UE can return to sleep as it is not being paged. As shown in FIG. 5 a first PI occasion 500 may be utilised by the base station if no TRS transmissions are to be made, and a second PI occasion 501 may be utilised by the base station if TRS will be transmitted (at TRS occasion 502 in this example).

The possible PI locations can be set by configuration or signalled to the UE by the base station for example in RRC signalling. There is therefore provided a method of paging a UE comprising transmitting a PI to a UE to be paged at a first location in time, the first location indicating that TRS will be transmitted for the UE, or at a second location in time, the second location indicating that TRS will not be transmitted for the UE prior to the PO.

DCI-based PI, P-DCI, or P-PDSCH have additional payload capacity that can be used to indicate the presence, and configuration, of TRS. However, the UE must have already achieved loop convergence to be able to decode the signals. TRS are therefore beneficial before the PI-DCI, but may not be necessary between the PI and PO if they are close together as the loop convergence achieved for the PI-DCI will be retained through to the PO to receive and decode the P-DCI and P-PDSCH. The PI-DCI or P-DCI may thus be utilised to indicate the presence of active TRS occasions prior to the subsequent PI transmission (s), active TRS occasions between PI and PO (for the current or subsequent POs), (changes to) the active TRS occasions within the TRS window, and/or modification of the TRS window configuration.

TRS configurations or details of active TRS occasions transmitted to a UE may be time-limited such that they apply for a specified duration. The duration may be specified in terms of DRX cycles, or other convenient parameter.

The indication of active TRS occasions may be in the form of a bitmap, wherein each bit is associated with a TRS occasion in the TRS window and indicates whether that TRS occasion is active. The bitmap may be transmitted in any of the messages described above (DCI-based PI, P-DCI, or P-PDSCH) and may provide information on the current or subsequent PO (s). The application of the configuration may be time-limited.

The payload of the P-DCI/PI-DCI may be large enough to be used to modify the TRS configurations for RRC_IDLE/INACTIVE. For example, TRS configurations may be enabled or disabled, for example by transmitting a bitmap in which each bit corresponds to a configuration and indicates its status. If only one TRS configuration can be active at a time the signal may indicate the identity of the configuration that is active (as opposed to a bitmap).

Information may be conveyed in conjunction with a P(I)-DCI by using different RNTIs to scramble the P-DCI/PI-DCI. For example, one RNTI may indicate no TRS occasions are active and another may indicate that TRS occasions are active in accordance with the current configuration. More RNTIs may be utilised to convey more information, but that increases the decoding burden.

The TRS configuration should be indicated each time UEs are paged because new UEs may have switched to RRC_IDLE/INACTIVE and hence need to be made aware of the TRS configuration that is applicable. The TRS configuration could be included in the RRC RELEASE message such that UEs receive the configuration as the transition to RRC_IDLE/INACTIVE.

Indicating all TRS parameters via SIB/RRC signalling for all UEs in a PO may incur a significant overhead. A mix of signalling may therefore be utilised depending on the frequency with which the relevant parameters change. For example, the active TRS occasions and/or active TRS configurations, which are likely to change frequently may be indicated in the PI or P-DCI. Aspects which are less likely to change, such as adding & removing TRS resource sets, configurations shared between RRC_CONNECTED and RRC_IDLE/INACTIVE, or the TRS window configuration, may be indicated in the P-PDSCH (or P-DCI if PI exists).

A signal in the PI/P-DCI may be utilised to indicate if the TRS configuration is to be updated. The signal could be a flag in the PI-DCI payload, a particular combination of bits in the PI-DCI payload, the P(I)-DCI may be scrambled with a special RNTI, or for RS-based PI a special sequence may indicate a TRS configuration change. If a TRS configuration change is to be made, all UEs associated with the PO have to wake and receive the paging messages such that they receive and decode the new TRS configuration. The TRS configuration can thus be updated using the paging messages and there is no need for RRC or SIB signalling which may be inefficient for the UE to receive.

Cross-slot scheduling has been proposed for paging reception together with UE grouping in the P-DCI to save power. All UEs decode the P-DCI, but only the group (s) of UEs indicated in the P-DCI will proceed and decode the associated PDSCH. Since the paging PDCCH and corresponding PDSCH are not transmitted in the same slot, the group (s) that are not being paged do not have to needlessly buffer data to decode the potential paging message in the next slot. PDSCH reception especially benefits from fine time-frequency synchronization. Therefore, it will be beneficial if there is at least one TRS transmission between the P-DCI and the associated PDSCH. The presence of TRS in case of cross-slot scheduling can be indicated in the P-DCI, for example, by utilizing some of the reserved bits or by scrambling the DCI payload with a different RNTI.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD)® read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally 45 referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory. In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices.

Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

What is claimed is:

1. A method of configuring tracking reference signals in a cellular communications system for use while a user equipment (UE) is in idle mode, the method performed by a base station and comprising:

defining at least one tracking reference signal configuration comprising periodic transmission occasions for tracking reference signals;

defining a tracking reference signal window in relation to at least one paging occasion, the tracking reference signal window specifying a time interval during which tracking reference signals are to be transmitted for assisting loop convergence of the UE, and wherein the base station only transmits tracking reference signals in transmission occasions falling within the tracking reference signal window;

transmitting an indication of active transmission occasions within the tracking reference signal window in which the base station will transmit the tracking reference signals, the indication comprising a bitmap in which each bit corresponds to a tracking reference signal occasion or a group of tracking reference signal occasions associated with the defined tracking reference signal configuration; and transmitting the tracking reference signals in the active transmission occasions indicated by the bitmap.

2. The method of claim 1, wherein bits of the bitmap correspond to respective transmission occasions within the tracking reference signal window and indicate whether each transmission occasion is active.

3. The method of claim 1, wherein the periodic transmission occasions have a period of 10 ms, 20 ms, 40 ms, or 80 ms.

4. The method of claim 1, wherein the tracking reference signal window spans at least the period between a paging indication and the paging occasion.

5. The method of claim 1, wherein the at least one tracking reference signal configuration is specific for use while UEs are in idle mode.

6. The method of claim 1, wherein the tracking reference signal configuration is transmitted in RRC signaling.

7. The method of claim 6, wherein the tracking reference signal configuration is transmitted in a system information block transmission.

8. The method of claim 1, wherein the tracking reference signal configuration is cell-specific or paging-occasion-specific.

9. The method of claim 1, wherein the active transmission occasions include at least one transmission occasion prior to a paging indication.

10. The method of claim 1, wherein the active transmission occasions apply to a group of UEs that are active for a particular paging occasion.

11. The method of claim 1, wherein the indication of active transmission occasions comprises a sequence transmitted as a paging indication.

12. The method of claim 11, wherein each sequence corresponds to a respective set of active transmission occasions.

13. The method of claim 1, wherein the indication of active transmission occasions comprises timing of a paging indication relative to the paging occasion.

14. The method of claim 1, further comprising transmitting an indication of a tracking reference signal configuration of the defined at least one tracking reference signal configuration that is enabled for a UE to which the indication is transmitted.

15. The method of claim 14, wherein the indication is transmitted as a bitmap in which each bit corresponds to a tracking reference signal configuration.

16. A base station, comprising at least one processor and at least one memory storing instructions which, when executed, cause the base station to perform:

defining at least one tracking reference signal configuration comprising periodic transmission occasions for tracking reference signals;

defining a tracking reference signal window in relation to at least one paging occasion, the tracking reference signal window specifying a time interval during which tracking reference signals are to be transmitted for assisting loop convergence of the UE, and wherein the base station only transmits tracking reference signals in transmission occasions falling within the tracking reference signal window;

transmitting an indication of active transmission occasions within the tracking reference signal window in which the base station will transmit the tracking reference signals, the indication comprising a bitmap in which each bit corresponds to a tracking reference signal occasion or a group of tracking reference signal occasions associated with the defined tracking reference signal configuration; and transmitting the tracking reference signals in the active transmission occasions indicated by the bitmap.

17. A cellular communications system comprising a base station and at least one user equipment (UE), wherein the base station is configured to perform:

defining at least one tracking reference signal configuration comprising periodic transmission occasions for tracking reference signals;

defining a tracking reference signal window in relation to at least one paging occasion, the tracking reference signal window specifying a time interval during which tracking reference signals are to be transmitted for assisting loop convergence of the UE, and wherein the base station only transmits tracking reference signals in transmission occasions falling within the tracking reference signal window;

transmitting an indication of active transmission occasions within the tracking reference signal window in which the base station will transmit the tracking reference signals, the indication comprising a bitmap in which each bit corresponds to a tracking reference signal occasion or a group of tracking reference signal occasions associated with the defined tracking reference signal configuration; and transmitting the tracking reference signals in the active transmission occasions indicated by the bitmap.

* * * * *